(12) United States Patent
Kobayashi

(10) Patent No.: US 6,172,841 B1
(45) Date of Patent: *Jan. 9, 2001

(54) RECORDING / REPRODUCING APPARATUS WITH A PROJECTION PROVIDED IN CUTOUT IN ELASTIC MEMBER POSITIONED ALONG CAM SLOT

(75) Inventor: Junji Kobayashi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/715,935

(22) Filed: Sep. 19, 1996

(30) Foreign Application Priority Data

Sep. 29, 1995 (JP) .................................................. 7-253539

(51) Int. Cl.[7] ........................... G11B 15/675; G11B 15/61
(52) U.S. Cl. ......................... 360/96.5; 360/85; 242/338.4
(58) Field of Search ............................... 360/96.5, 85, 95; 242/338.4, 332

(56) References Cited

U.S. PATENT DOCUMENTS 5,361,180 * 11/1994 Yamabuchi et al. ................. 360/96.5
5,426,546 * 6/1995 Tomitaka et al. ....................... 360/85
5,459,626 * 10/1995 Lee et al. ................................ 360/85
5,608,589 * 3/1997 Kang et al. ............................. 360/85

FOREIGN PATENT DOCUMENTS 4-283464 * 10/1992 (JP) .
5-210899 * 8/1993 (JP) .

* cited by examiner

Primary Examiner—Craig A. Renner
(74) Attorney, Agent, or Firm—Robin, Blecker & Daley

(57) ABSTRACT

A recording and/or reproducing apparatus having a rotary drum includes a first chassis assembly on which the rotary drum is provided, a second chassis assembly which is supported for sliding movement on the first chassis within a predetermined stroke, an arm rotatably provided on the first chassis assembly and having a pin at one end, the pin being engaged with a slot, which is provided in the second chassis assembly, so that the arm slides the second chassis assembly and a driving member for turning the arm in such a manner that an amount of travel of the pin in a travelling direction of the second chassis assembly is made slightly greater than a sliding stroke of the second chassis assembly. The second chassis assembly is configured adjacent the slot to allow the pin to travel when the second chassis assembly has reached the end of the sliding stroke.

12 Claims, 6 Drawing Sheets

RECORDING / REPRODUCING APPARATUS WITH A PROJECTION PROVIDED IN CUTOUT IN ELASTIC MEMBER POSITIONED ALONG CAM SLOT

BACKGROUND OF THE INVENTION

1. Field of the Invention

The present invention relates to a recording and/or reproducing apparatus such as a video tape recorder (VTR) and, more particularly, to a sliding mechanism for sliding a cassette chassis on which a tape cassette is set.

2. Description of the Related Art

In this kind of recording and/or reproducing apparatus, for the purpose of reducing its entire size, a slidable chassis on which a tape cassette is set is slidably supported on a main chassis provided with a rotary drum, so that the slidable chassis is moved toward and away from the main chassis.

FIG. 8 diagrammatically shows a conventional recording and/or reproducing apparatus, particularly an arrangement example of a slidable-chassis sliding mechanism and its associated constituent components. As shown in FIG. 8, a rotary drum 1 is rotatably supported on a main chassis 2, and a slidable chassis 5 is supported for sliding movement on the main chassis 2 within a predetermined stroke (refer to a double-headed arrow A). A slide arm 4 is turnably supported on the main chassis 2 by a pin 2d, and is connected to a cam gear 3 by a pin 4a which is engaged with a cam slot of the cam gear 3. The slide arm 4, which is driven to turn about the pin 2d in interlocking relationship to the cam gear 3, and the slidable chassis 5 are pin-connected by a connecting pin 4b through a slot 10 of a member affixed to the slidable chassis 5 by fittings 11, so that the slidable chassis 5 is slid by the rotation of the cam gear 3.

In the example shown in FIG. 8, the connecting pin 4b which connects the slide arm 4 and the slidable chassis 5 is engaged with a slot portion (or slot) 10 formed in the slidable chassis 5. In this case, the slot portion 10 consists of a separate constituent component which is positionally adjustably secured to the slidable chassis 5 by screws 11.

In the example shown in FIG. 9, a slot portion 10' with which the connecting pin 4b is engaged is provided on the slidable chassis 5 by outsert molding.

However, the conventional recording and/or reproducing apparatus has a number of problems. In the case of the example shown in FIG. 8, since the slot portion 10 need be prepared as a separate constituent component, not only does the number of constituent components increase but also the number of steps required for positioning and fixing the slot portion 10 increases. This leads to an increase in cost.

The structure shown in FIG. 9 involves the risk of producing a play between the main chassis 2 and the slidable chassis 5 at either end of the travel stroke of the slidable chassis 5 because of the presence of a positional tolerance of the connecting pin 4b due to permissible variations in the dimensions of constituent components. If a play occurs during recording or reproduction, a slack in tape will occur, so that a recording/reproduction failure may occur. If a play occurs during cassette unloading, a variation will occur in the standby position of a guide post, such as a tension arm, which performs a cam operation according to the position of the slidable chassis 5, as shown in FIG. 9. The guide post whose standby position has varied may come into contact with and give damage to the tape.

SUMMARY OF THE INVENTION

It is, therefore, an object of the present invention to provide a recording and/or reproducing apparatus which can securely eliminate the play between a main chassis and a slidable chassis to enable appropriate operation of the apparatus.

To achieve the above object, in accordance with one aspect of the present invention, there is provided a recording and/or reproducing apparatus having a rotary drum which comprises a first chassis on which the rotary drum is provided, a second chassis which is supported for sliding movement on the first chassis within a predetermined stroke, an arm rotatably provided on the first chassis and having a pin at its one end, the pin being engaged with a slot, which is provided in the second chassis, so that the arm slides the second chassis, a driving member for turning the arm in such a manner that an amount of travel of the pin in a travelling direction of the second chassis is made slightly greater than a sliding stroke of the second chassis, and an elastic member provided around the slot and capable of coming into abutment with the pin while allowing the pin to travel, when the second chassis reaches an end of the sliding stroke.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of a recording and/or reproducing apparatus according to the present invention will be described below with reference to FIGS. 1 to 7.

Figure 1:
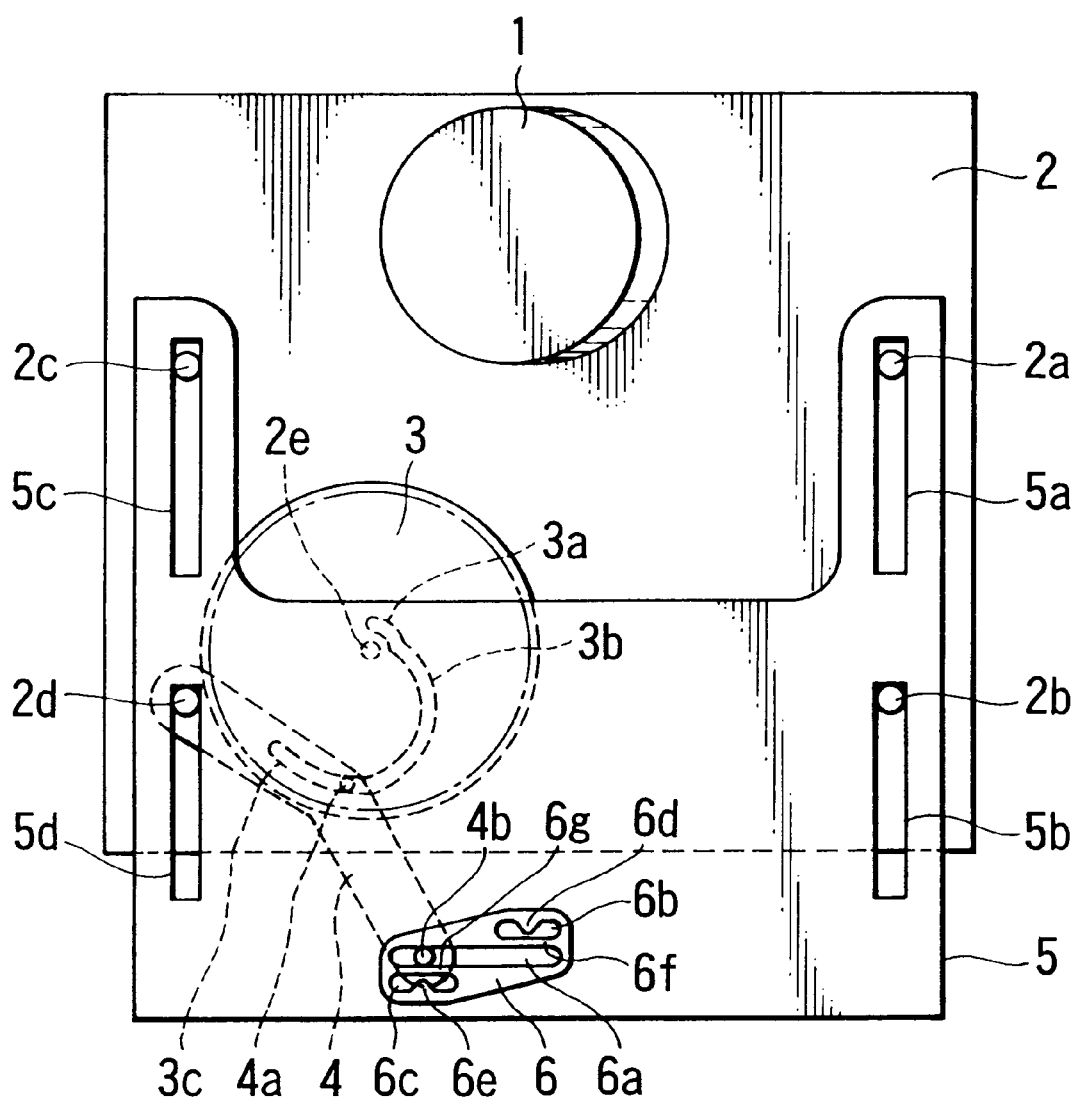
FIG. 1 is a diagrammatic plan view showing an arrangement example of an embodiment of a recording and/or reproducing apparatus according to the present invention.

FIG. 1 diagrammatically shows the main feature of the present embodiment. The embodiment shown in FIG. 1 includes a rotary drum 1 provided with a plurality of magnetic heads (not shown), a main chassis 2 on which the rotary drum 1 is provided, and guide shafts 2a to 2d which project from the main chassis 2. Each of the guide shafts 2a to 2d has a step as well as an internally threaded central portion. A cam gear 3 is provided for rotation about a shaft 2e which projects from the main chassis 2, and is arranged to be rotationally driven by driving means (not shown).

A slide arm 4 is provided for rotation about the guide shaft 2d which projects from the main chassis 2, and a pin 4a projects from the slide arm 4 in the direction opposite to the main chassis 2. The pin 4a is slidably engaged with cam slots 3a and 3c which are concentrically formed in the cam gear 3, and with a cam slot 3b which connects the cam slots 3a and 3c. A slidable chassis 5 is provided with reel mounts (not shown) so that a cassette can be set on the slidable chassis 5, and slots 5a to 5d of the slidable chassis 5 are slidably engaged with the steps of the respective guide shafts 2a to 2d of the main chassis 2 by screws 20.

A resin piece 6 is formed on the slidable chassis 5 by outsert molding, and a connecting pin 4b which projects from the slide arm 4 is slidably engaged with a slot 6a of the resin piece 6. When the pin 4a of the slide arm 4 is brought in engagement with the cam slot 3a or 3c of the cam gear 3, i.e., when the slidable chassis 5 is located at either end of its sliding stroke, the connecting pin 4b is located close to an end portion 6f or 6g of the slot 6a adjacent to which a cutout 6b or 6c (a space of predetermined length) is formed in the resin piece 6. In addition, projections 6d and 6e for restraining the deformations of the corresponding end portions 6f and 6g are respectively formed in the cutouts 6b and 6c at locations either of which is closest to the connecting pin 4b in the slot 6a when the slidable chassis 5 is located at either end of the sliding stroke. In other words, the widths of the respective cutouts 6b and 6c are smallest at the locations where the corresponding projections 6d and 6e are formed.

The amount of travel of the connecting pin 4b is set to slightly overhang the sliding stroke of the slidable chassis 5. Specifically, the dimensional tolerance or play of the connecting pin 4b with respect to the end portions 6f and 6g is set so that the connecting pin 4b overlaps the end portion 6f or 6g of the slot 6a when the pin 4a is brought in engagement with the cam slot 3a or 3c of the cam gear 3 in the above-described manner. In other words, the movable range of the slidable chassis 5 is set as the sliding stroke determined by the length of each of the slots 5b and 5d, and the amount of travel of the connecting pin 4b driven by the slide arm 4 is set slightly greater than such sliding stroke.

In the recording and/or reproducing apparatus having the above-described arrangement, during the state shown in FIG. 1, the upper ends (as viewed in FIG. 1) of the slots 5b and 5d of the slidable chassis 5 are respectively brought in abutment with the guide shafts 2b and 2d of the main chassis 2. The slidable chassis 5 cannot slide any further, and the connecting pin 4b of the slide arm 4 deforms the end portion 6g of the slot 6a to such an extent that the end portion 6g does not come into abutment with the projection 6e (refer to FIG. 4(A)). Accordingly, as long as the apparatus is left in this state, the play of the slidable chassis 5 relative to the main chassis 2 does not occur.

During this state, if the slidable chassis 5 receives an external force which acts toward the rotary drum 1, the pressure of the connecting pin 4b against the end portion 6g increases to deform the end portion 6g to a further extent (refer to FIG. 4(B)). However, in this case, since the end portion 6g comes into abutment with the projection 6e, further deformation of the end portion 6g is restrained by the projection 6e, so that the end portion 6g is prevented from being permanently deformed beyond the state shown in FIG. 4(B).

Figure 2:
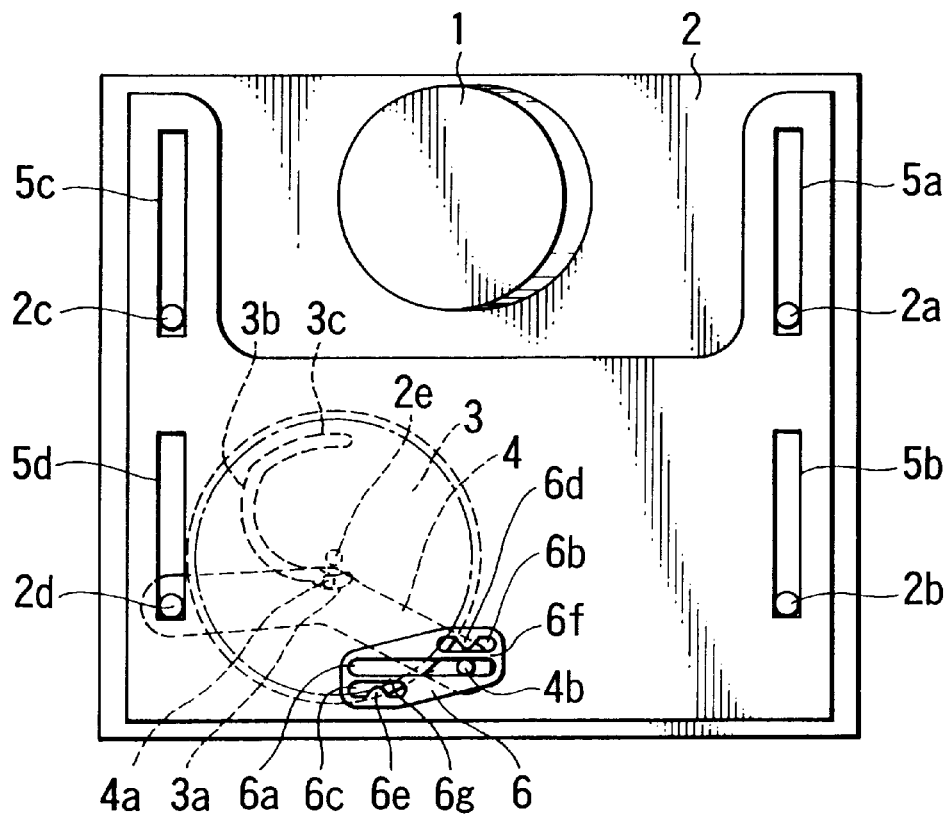
FIG. 2 is a diagrammatic plan view showing an operation example of the embodiment of the recording and/or reproducing apparatus according to the present invention.
Figure 3:
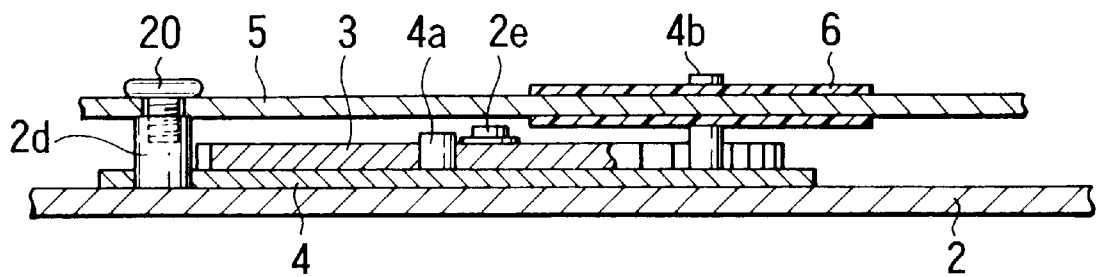
FIG. 3 is a vertical sectional view showing the essential portion of the embodiment of the recording and/or reproducing apparatus according to the present invention.

During this state, if a cassette holder (not shown) is accommodated into the apparatus, the cam gear 3 rotates clockwise and the pin 4a travels along the cam slot 3b, thereby turning the slide arm 4 counterclockwise. Then, the connecting pin 4b in the slot 6a presses the resin piece 6 so that the slidable chassis 5 slides toward the rotary drum 1 and guide posts (not shown) travel. When the pin 4a reaches the cam slot 3a, the slidable chassis 5 reaches its stroke end closer to the rotary drum 1, as shown in FIG. 2. During the state shown in FIG. 2, the lower ends (as viewed in FIG. 2) of the slots 5b and 5d of the slidable chassis 5 are respectively brought in abutment with the guide shafts 2b and 2d of the main chassis 2. The connecting pin 4b of the slide arm 4 deforms the end portion 6f of the slot 6a to such an extent that the end portion 6f does not come into abutment with the projection 6d. Accordingly, as long as the apparatus is left in this state, the play of the slidable chassis 5 relative to the main chassis 2 does not occur.

During this state, if an external force which acts in a direction away from the rotary drum 1 works on the slidable chassis 5, the end portion 6f is deformed to a further extent by the connecting pin 4b. However, in this case, since the end portion 6f comes into abutment with the projection 6d, further deformation of the end portion 6f is restrained by the projection 6d, so that the end portion 6f is prevented from being permanently deformed beyond the state shown in FIG. 2.

Figure 5:
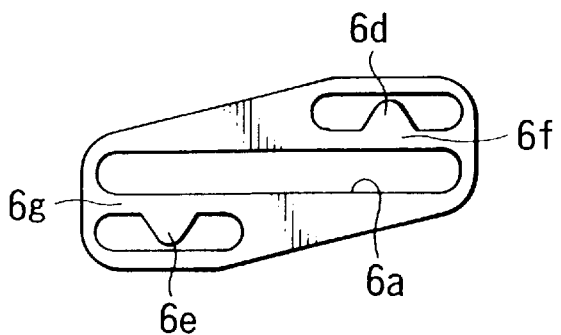
FIG. 5 is a diagrammatic plan view showing a modification of the resin piece used in the recording and/or reproducing apparatus according to the present invention.
Figure 6:
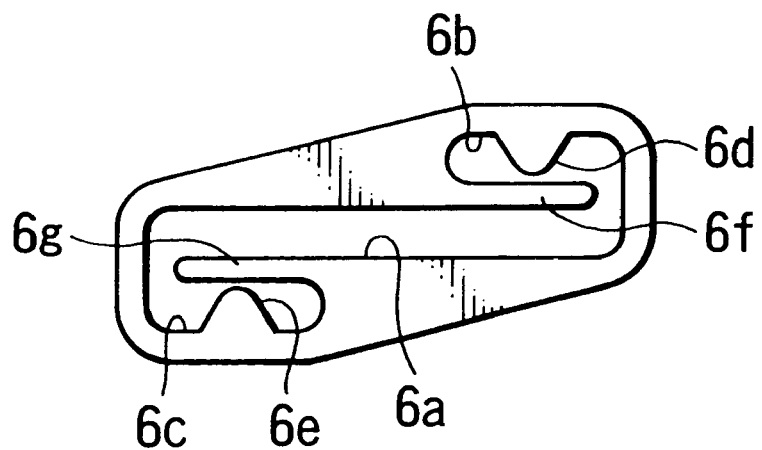
FIG. 6 is a diagrammatic plan view showing another modification of the resin piece used in the recording and/or reproducing apparatus according to the present invention.
Figure 7:
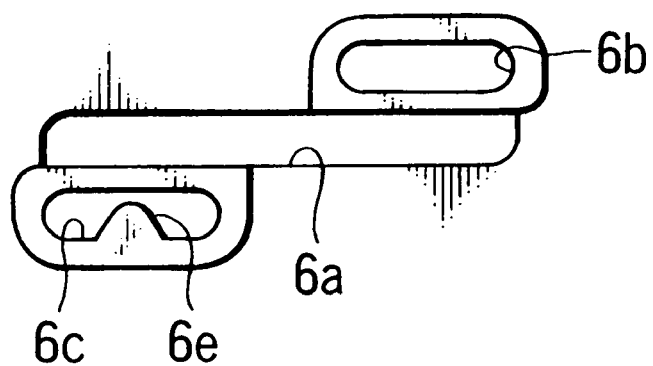
FIG. 7 is a diagrammatic plan view showing still another modification of the resin piece used in the recording and/or reproducing apparatus according to the present invention.
Figure 8:
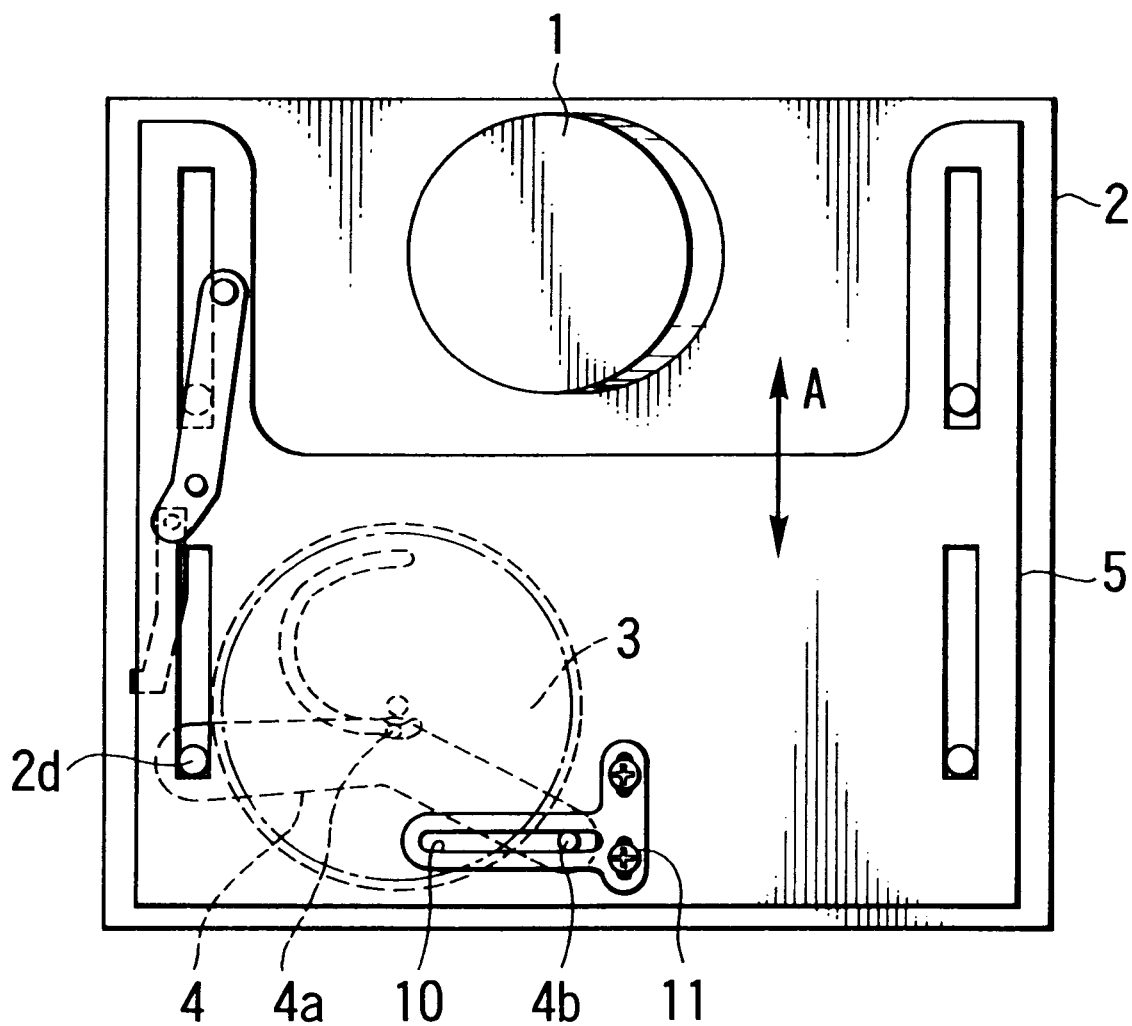
FIG. 8 is a diagrammatic plan view showing an arrangement example of a conventional recording and/or reproducing apparatus.
Figure 9:
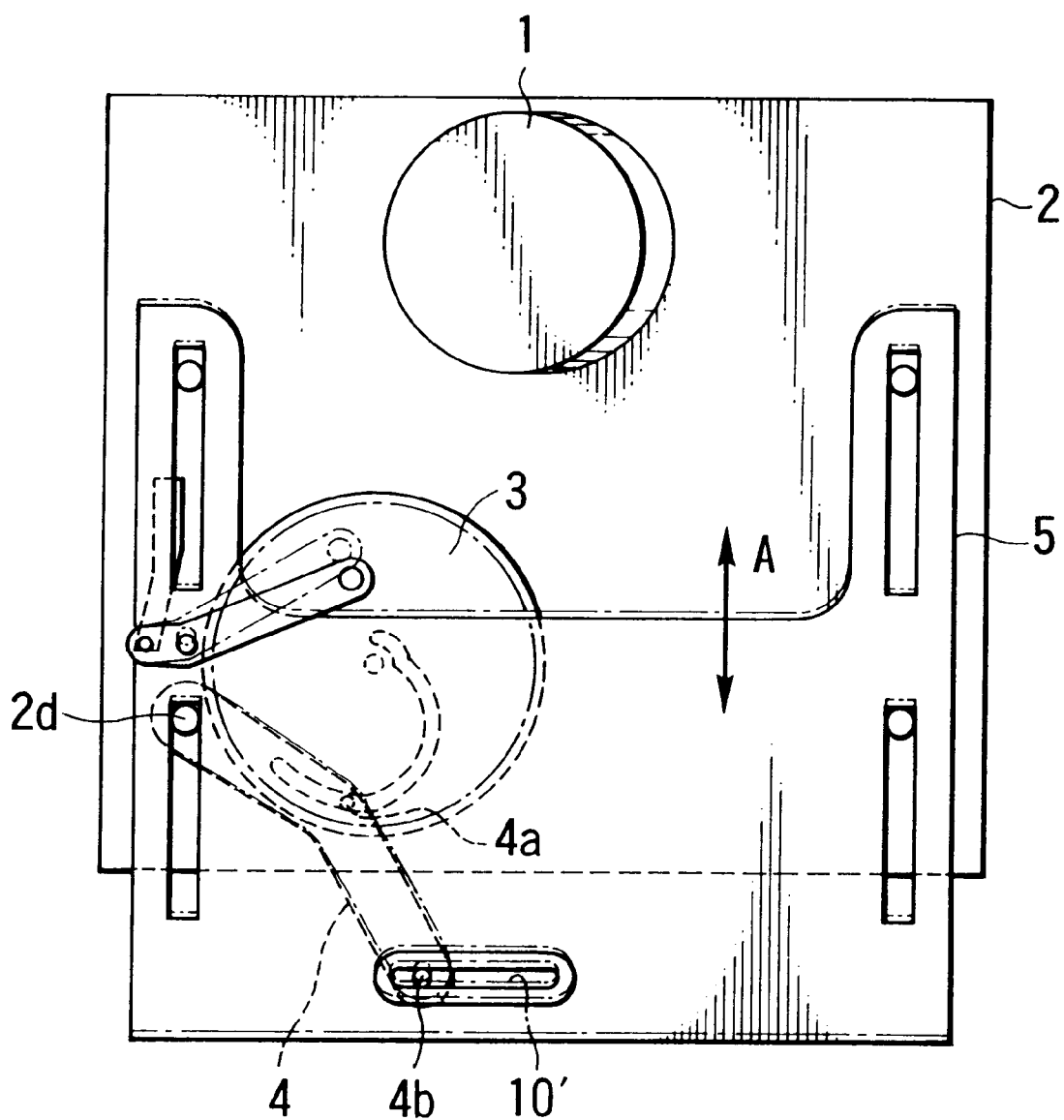
FIG. 9 is a diagrammatic plan view showing another arrangement example of the conventional recording and/or reproducing apparatus.

FIGS. 5 to 7 show modifications of the resin piece 6.

Figure 4:
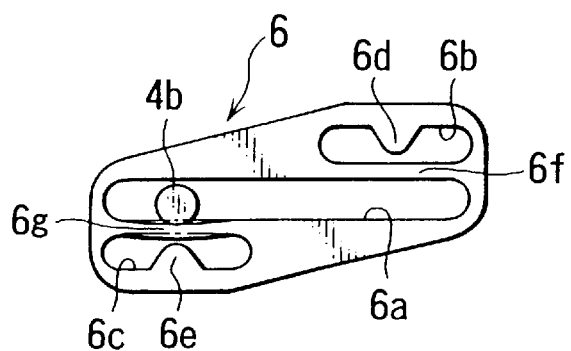
FIG. 4(A) is a diagrammatic plan view showing an arrangement example of a resin piece used in the recording and/or reproducing apparatus according to the present invention.
FIG. 4(B) is a diagrammatic plan view showing the operation of the resin piece shown in FIG. 4(A)
Figure 4:
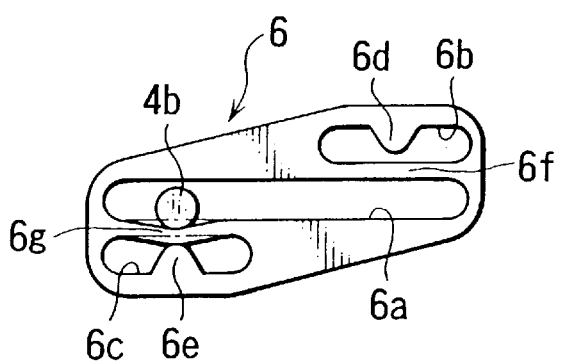

In the modification shown in FIG. 5, the projections 6d and 6e are respectively provided on the end portions 6f and 6g which are opposite to the sides on which the projections 6d and 6e are provided in the embodiment of FIG. 4. In the modification shown in FIG. 6, the cutouts 6b and 6c are formed to communicate with the slot 6a.

The end portions 6f and 6g or the corresponding resin portions, with which the connecting pin 4b selectively comes into abutment when the slidable chassis 5 reaches either end of the sliding stroke, may be independently formed or in different shapes, as shown in FIG. 7. Since the possibility that an external force is applied to the slidable chassis 5 is small when the slidable chassis 5 is located at the end of the sliding stroke that is closer to the rotary drum 1, the projection 6d or a similar portion may be omitted so that the cutout 6b is formed as a cutout having no reduced-width portion.

As is apparent from the above description, in the present embodiment, the slot (slot portion) 6a is formed in the slidable chassis 5 by outsert molding, and the cutouts 6b and 6c (spaces of predetermined length) are respectively formed adjacent to the end portions 6f and 6g of the slot 6a with which the connecting pin 4b selectively comes into abutment when the slidable chassis 5 reaches either end of the sliding stroke. According to this arrangement, the resin portions of the end portions 6f and 6g of the slot 6a with which the connecting pin 4b selectively comes into abutment are made less rigid and hence more flexible, so that the amount of overhang of the connecting pin 4b with respect to the slidable range of the slidable chassis 5 can be absorbed even if the amount of travel of the connecting pin 4b, which includes the amount of tolerance or play, is set large.

In addition, the projections 6d and 6e for restraining the deformations of the corresponding end portions 6f and 6g of the slot 6a are respectively formed in the cutouts 6b and 6c, that is, the widths of the respective cutouts 6b and 6c are made smaller in particular spatial areas than in the other areas, the particular spatial areas being respectively closest to predetermined portions of the slot 6a with which the connecting pin 4b selectively comes into abutment when the slidable chassis 5 reaches either end of the sliding stroke. According to this arrangement, even if an excessive external force acts on the slidable chassis 5 in the direction of elastic deformation of either of the resin portions of the end portions 6f and 6g of the slot 6a, the resin portions can be restrained from being excessively deformed.

In general, the amount of such restraint is approximately 0.5 mm. If cutouts having uniform widths are to be formed for the purpose of ensuring the elasticity of the end portions 6f and 6g of the slot 6a, the corresponding portions of a forming mold structure need be made thin, so that the problem of strength occurs in such portions. However, according to the present embodiment, since only particular portions of the cutouts 6b and 6c (the portions with which the connecting pin 4b selectively comes into abutment) are made narrower and the other portions of the cutouts 6b and 6c are made wider, a sufficient strength can be ensured for the forming mold structure.

As is apparent from the foregoing description, according to the present embodiment, in this kind of recording and/or reproducing apparatus, the play of the main chassis and that of the slidable chassis can be securely prevented from occurring during cassette loading and during recording/reproduction, without incurring a cost increase due to an increase in the number of constituent components. In addition, it is possible to accurately set the position of a drawing tape guide, such as a tension arm, which operates by using the relative position between the two chassis, so that tape can be prevented from being damaged by the contact of the tape with the drawing tape guide during cassette loading. It is also possible to extremely effectively prevent a recording/reproduction failure or the like from being caused by a decrease in the tension of the tape due to a displacement of the slidable chassis (or a cassette) due to the application of a slight external force during recording/reproduction. In addition, the aforesaid structure for preventing the resin pieces from undergoing permanent deformation if an excessive external force acts on the slidable chassis has another advantage, such as the advantage of reducing a burden on the strength of a forming mold.

What is claimed is:

1. A recording and/or reproducing apparatus having a rotary drum, comprising:
   (a) a first chassis on which said rotary drum is provided;
   (b) a second chassis which is supported for sliding movement on said first chassis within a predetermined stroke;
   (c) an arm rotatably provided on said first chassis and having a pin at its one end, said pin being engaged with a slot, which is provided in said second chassis, so that said arm slides said second chassis relative to said first chassis;
   (d) a driving member for driving said arm to slide said second chassis in such a manner that a moving range of said pin in a sliding direction of said second chassis is set slightly greater than said predetermined stroke of said second chassis; and
   (e) an elastic member provided adjacent to said slot for absorbing an over-stroke of said pin of said arm caused by said moving range of said pin being greater than said predetermined stroke of said second chassis in both ends of said slot, wherein said elastic member is deformable by said pin and includes a restraining member for restraining an amount of deformation of said elastic member.

2. A recording and/or reproducing apparatus according to claim 1, wherein said elastic member is formed of a resin and has a cutout, different from said slot, formed close to its portion which comes into abutment with said pin.

3. A recording and/or reproducing apparatus according to claim 2, wherein said slot and said cutout communicate with each other.

4. A recording and/or reproducing apparatus according to claim 2, wherein said restraining member has a projection provided in said cutout.

5. A recording and/or reproducing apparatus according to claim 4, wherein said projection is provided in said cutout on a side of said cutout adjacent to said slot.

6. A recording and/or reproducing apparatus according to claim 4, wherein said projection is provided in said cutout on a side of said cutout spaced from said slot.

7. A recording and/or reproducing apparatus having a rotary drum, comprising:
   (a) a first chassis on which said rotary drum is provided;
   (b) a second chassis which is supported for sliding movement on said first chassis within a predetermined stroke;
   (c) an elastic member secured to said second chassis and defining a slot;
   (d) an arm rotatably provided on said first chassis and having a pin at its one end, said pin being engaged with said slot, so that said arm slides said second chassis; and
   (e) a driving member for turning said arm to slide said second chassis in such a manner that a moving range of said pin in a sliding direction of said second chassis is set slightly greater than said predetermined stroke of said second chassis,
   wherein said elastic member includes a deformable portion for absorbing an over-stroke of said pin of said arm caused by said moving range of said pin being greater than said predetermined stroke of said second chassis in both ends of said slot and a restraining member for restraining an amount of deformation of said deformable portion.

8. A recording and/or reproducing apparatus according to claim 7, wherein said elastic member is formed of a resin and has a cutout, different from said slot, formed close to said deformable portion which comes into abutment with said pin.

9. A recording and/or reproducing apparatus according to claim 8, wherein said slot and said cutout communicate with each other.

10. A recording and/or reproducing apparatus according to claim 8, wherein said restraining member has a projection provided in said cutout.

11. A recording and/or reproducing apparatus according to claim 10, wherein said projection is provided in said cutout on a side of said cutout adjacent to said slot.

12. A recording and/or reproducing apparatus according to claim 10, wherein said projection is provided in said cutout on a side of said cutout spaced from said slot.

* * * * *